United States Patent [19]
Herzig et al.

[11] Patent Number: 6,085,885
[45] Date of Patent: *Jul. 11, 2000

[54] FRICTION CLUTCH ARRANGEMENT

[75] Inventors: Stefan Herzig, Calberlah; Jürgen Osterlänger, Emskirchen; Kark-Ludwig Grell, Aurachtal; Ernst Strian, Kunreuth, all of Germany

[73] Assignee: Volkswagen AG, Wolfsburg, Germany

[ * ] Notice: This patent is subject to a terminal disclaimer.

[21] Appl. No.: 09/333,354

[22] Filed: Jun. 15, 1999

Related U.S. Application Data

[63] Continuation of application No. PCT/EP97/07184, Dec. 19, 1997.

[30] Foreign Application Priority Data

Dec. 19, 1996 [DE] Germany .......................... 196 52 777

[51] Int. Cl.7 .................................................. F16D 19/00
[52] U.S. Cl. .................................. 192/85 CA; 192/30 W
[58] Field of Search ........................... 192/30 W, 85 CA, 192/91 A, 98; 92/5 R; 60/354; 340/453; 324/207.15, 207.16

[56] References Cited

U.S. PATENT DOCUMENTS

| | | |
|---|---|---|
| 4,474,274 | 10/1984 | Lutz et al. ........................... 192/30 W |
| 4,621,565 | 11/1986 | Leigh-Monstevens . |
| 4,705,151 | 11/1987 | Leigh-Monstevens et al. . 192/30 W X |
| 4,867,294 | 9/1989 | de Tuesta . |
| 5,445,257 | 8/1995 | Grabis . |
| 5,758,758 | 6/1998 | Friedrich .......................... 192/30 W X |

FOREIGN PATENT DOCUMENTS 2256907  12/1992  United Kingdom .

*Primary Examiner*—Richard M. Lorence
*Attorney, Agent, or Firm*—Baker Botts L.L.P.

[57] ABSTRACT

A friction clutch arrangement for motor vehicles to control a clutch friction disk rotationally mounted on a transmission shaft which can be locked between two components has a clutch actuating device which includes a slave device adjacent to the clutch, a master device remote from the clutch and a force transmission system between the two devices. The slave device includes a fixed cylinder containing non-ferromagnetic conductive material, a movable piston and a variable inductance travel sensor extending substantially parallel to the path of the piston which makes it possible to determine the position of the piston in the slave cylinder independently of external influences such as vibrations or dirt or of the influence of neighboring components.

4 Claims, 3 Drawing Sheets

FRICTION CLUTCH ARRANGEMENT

REFERENCE TO RELATED APPLICATIONS

This is a continuation of copending International application No. PCT/EP97/07184 filed Dec. 19, 1997.

BACKGROUND OF THE INVENTION

This invention relates to friction clutch arrangements for motor vehicles. British Patent No. 2,256,907 discloses a friction clutch arrangement having a clutch disk which can be locked between two components and which is rotationally fixed to a transmission shaft, a clutch spring for locking the clutch disk between the two components, a clutch actuating device with a slave device situated near the clutch, a master device remote from the clutch, and a force transmission system between said two devices. In this arrangement, the slave device located near the clutch includes a fixed housing concentrically surrounding the transmission shaft and having two radially spaced axial extensions which are arranged concentrically to form an annular space and a piston that is movable within the annular space and is frictionally connected to the clutch disk. The slave device includes a piston motion sensor with a variable resistance, a variable capacitance, or a variable induction. If a piston sensor with a variable resistance, a variable capacitance or a variable inductance is provided, two cables must be connected to the slave device. Routing of the cables presents a problem, particularly with parts that move with respect to each other. Another problem of the two piston sensors of that type is that many moving metal components are present in the slave device which can influence the variable quantity that produces the measurement signal, such as capacitance, resistance or induction. Moreover, the function of the piston motion sensor of this arrangement can be impaired by contaminants such as constituents of the clutch lining or oil escaping from the engine compartment. The piston sensor described in this reference which has a variable induction, is made of ferromagnetic material or has ferromagnetic components. In addition to the above-mentioned disadvantages of piston sensors with variable capacitance, a further disadvantage of all such sensors is that they are placed close to the friction clutch and can be moved or oscillated by operation of the clutch. These imported motions also influence the measurement signal.

U.S. Pat. No. 4,705,151 also discloses a friction clutch arrangement in which a slave cylinder of a slave device has a piston sensor with a variable inductance, capacitance, resistance or induction. The piston sensor described therein is only provided to indicate an extreme position of the piston, however. Detection of the piston position over the entire displacement path is not possible with such a sensor.

SUMMARY OF THE INVENTION

Accordingly, it is an object of the present invention to provide a friction clutch arrangement which overcomes disadvantages of the prior art.

Another object of the invention is to provide a friction clutch arrangement in which the position of the piston in a fixed slave cylinder of a slave device near the clutch can be sensed without interference from external conditions as contamination, vibration and the influence of adjacent components.

These and other objects of the invention are attained by providing a friction clutch arrangement having a piston sensor with a variable inductance extending essentially parallel to the path in which the piston is movable, the piston being made of or containing a nonferromagnetic, electrically conductive material. The movement of the piston induces an eddy current in the nonferromagnetic, electrically conductive metal, causing the inductance of the piston sensor to change. The piston sensor is part of a resonant circuit that also includes a capacitance and an inductance. Changing the inductance of the piston sensor changes the AC voltage present at the coil, and thus the resonant frequency of the resonant circuit. The change in resonant frequency then provides a measurement signal for displacement of the piston. With this sensor arrangement, only the piston sensor need by connected to an electrical cable; the piston itself need not be connected to an electrical cable. It is thus not necessary to connect any moving part to a cable.

Any adjacent ferromagnetic components, such as a transmission shaft or other parts, have no influence on the measurement signal because the magnetic permeability $\mu_r$ of ferromagnetic components is significantly greater than 1. The eddy currents induced in the ferromagnetic components are therefore negligible in comparison with the eddy currents in the nonferromagnetic components, which have a magnetic permeability $\mu_r$ of approximately 1. Also, vibrations and contaminants have no effect on the measurement result, as experiment has shown.

Preferably the slave cylinder is made in two parts with at least the region between the piston sensor and the piston being made of a nonmagnetic material. In this way, appropriate selection or treatment of the material prevents shielding of the alternating electric field generated by the travel sensor without requiring the entire slave cylinder to be made from that material or subjected to treatment.

It is useful for the piston sensor to extend along the entire displacement path of the piston, which enables sensing of the piston along its entire displacement path.

It is particularly advantageous for the nonferromagnetic, electrically conductive metal to be aluminum. Aluminum has the advantage that it has a particularly low electrical resistance and is relatively light. Because of its good electrical conductivity, an especially good measurement signal is achieved. The low weight of aluminum is advantageous in that it reduces the mass which must be moved during the motion of clutch disengagement.

BRIEF DESCRIPTION OF THE DRAWING

Further objects and advantages of the invention will be apparent from a reading of the following description in conjunction with the accompanying drawings, in which.

DESCRIPTION OF PREFERRED EMBODIMENT

Figure 1:
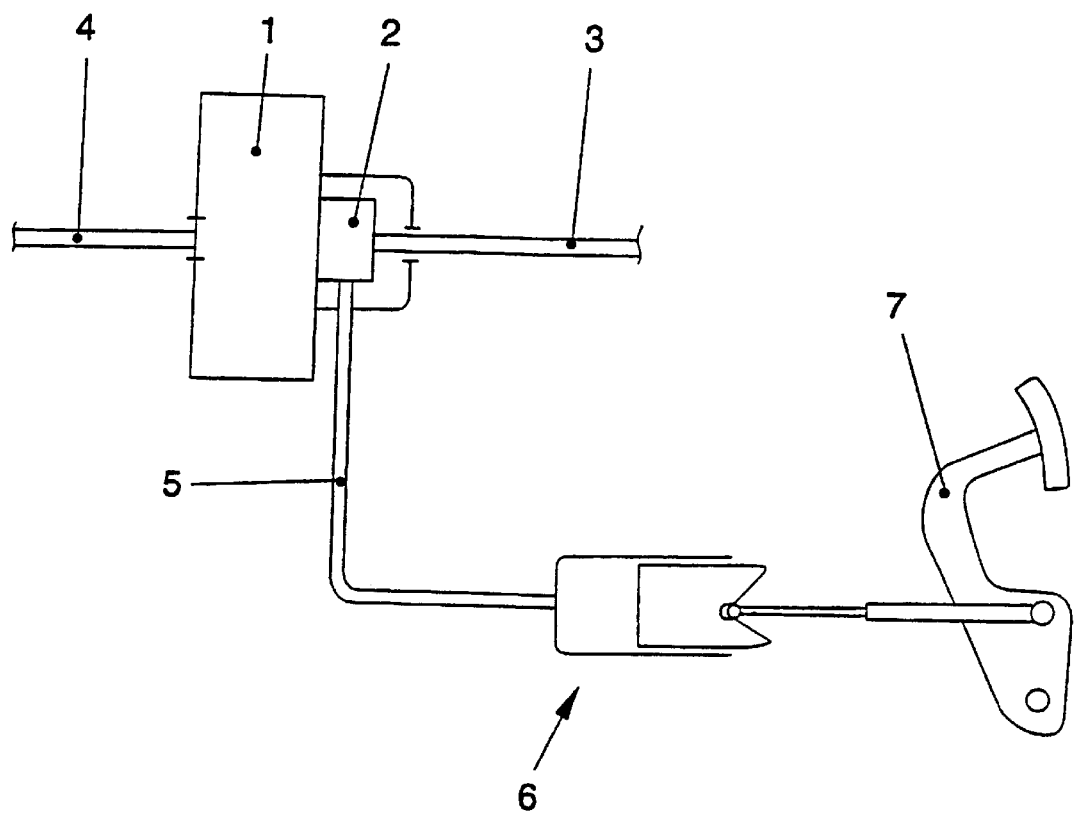
FIG. 1 is a schematic diagram illustrating a fluid-actuated friction clutch arrangement.

FIG. 1 shows the basic structure of a typical fluid-actuated friction clutch arrangement. In this arrangement a clutch pedal 7 acts directly upon a master cylinder 6, which is connected by a force transmission arrangement consisting of a pressure line 5 leading to a slave device 2 mounted on a friction clutch 1. The slave device 2, which is affixed to the housing of the friction clutch 1 has an annular slave cylinder formed by a housing 8 and a guide bushing 9, along with a pressure chamber 13 and a movable piston 11 that closes the pressure chamber 13 and is movable in the slave cylinder.

Application of fluid pressure through the pressure line 5 to the slave device 2 makes it possible to open or close the friction clutch 1 and thus to control the transmission of force from an engine crankshaft 4 to a transmission shaft 3 of a vehicle.

Figure 2:
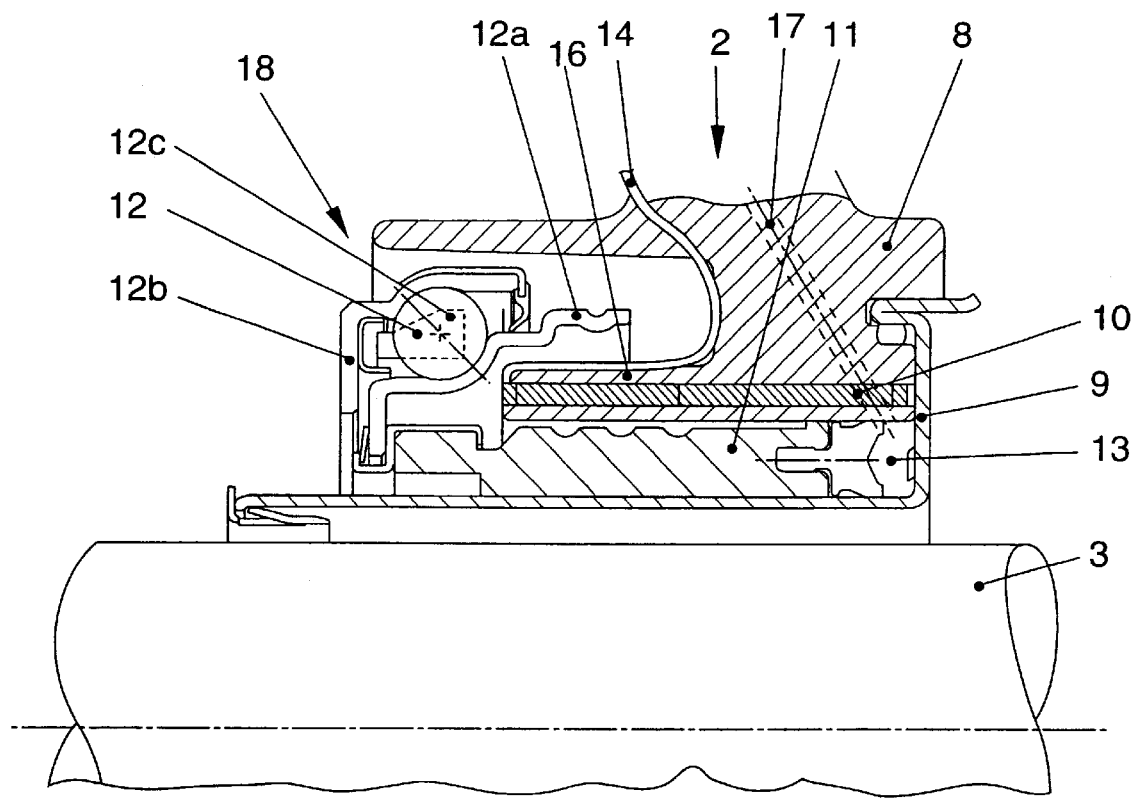
FIG. 2 is a sectional view illustrating a representative embodiment of a slave device situated near the friction clutch of FIG. 1 which includes a piston sensor in a radially outer part of the piston housing.

A representative slave device 2 is shown in cross-section in FIG. 2. In this illustration, the slave device 2 is shown in the engaged condition.

The slave device 2, which is arranged concentrically in relation to the transmission shaft 3, consists of the annular slave cylinder formed by the housing 8 and the guide bushing 9, and a disengaging unit 18 that can be moved with respect to the slave cylinder. A bore 17 in the housing 8 connects the fluid pressure line 5 at one end and with the pressure chamber 13 at the other end.

The disengaging unit 18 includes a piston 11 and a release bearing 12 which includes a nonrotating bearing part 12*a* in axial contact with the piston 11 and a rotating bearing part 12*b* which is frictionally connected to a disengagable clutch part (not shown).

The pressure chamber 13 formed by the guide bushing 9 and an axial extension 16 of the housing 8 is closed by the movable piston 11. It will be understood that the guide bushing 9 and the housing 8 can be combined in one piece.

When the clutch pedal 7 is depressed, pressure is produced in the master cylinder 6 and in the pressure line 5 and the bore 17 in the pressure chamber 13. As a result, the piston 11 is moved into the disengaged position. This movement of the piston 11 is transmitted by the bearing part 12*a*, the bearing body 12*c* and the bearing part 12*b* to the disengagable friction clutch part (not shown) causing the crankshaft 4 to be disconnected from the transmission shaft 3.

Mounted in the housing 8 adjacent to the piston 11 is a piston sensor 10 that extends along essentially the entire displacement path of the piston.

The piston sensor 10 includes a sensor coil cable to which an AC voltage is applied. As a result of the AC voltage, the piston sensor 10 is surrounded by an alternating electric field which is affected by the presence and location of the piston, thereby providing a measurement signal. The cable 14 connects the piston sensor 10 to an electrical device for analyzing the measurement signal which is located outside of the slave device 2. The cable 14 can, of course, contain a number of conductors.

The piston 11 is made of a nonferromagnetic, electrically conductive metal, or at least contains a nonferromagnetic, electrically conductive component or is securely affixed to such a component. The movement of the piston 11 in a direction perpendicular to the alternating field induces an eddy current in the piston 11. Nonferromagnetic, electrically conductive metals have a magnetic permeability $\mu_r$ of approximately 1. In contrast, ferromagnetic conductive metals have a magnetic permeability $\mu_r$ that is significantly greater than 1. The eddy currents induced in ferromagnetic components, such as in the transmission shaft 3, can therefore be ignored in comparison with the eddy currents induced in the piston 11. Detailed background information on the effects of magnetic permeability on induced eddy currents can be found in such publications as the *VDI Fortschrittberichte* [VDI Progress Reports], Series 8; *Meß-, Steuerung- und Regelungstechnik* [Measurement and Control Technology], No. 557; *Trennung der Einflußgrößen von Wirbelstromsensoren durch Signalverarbeitung mit Hilfe von Felduntersuchung und Modellierung* [Separating the variables that influence eddy current sensors by signal processing, using field study and modeling], by M. Sc. Yungiang Wang, Kassel, Germany.

The induced eddy current in the piston 11 opposes the alternating electric field in accordance with Lenz's Law, thereby changing the inductance of the travel sensor 10 and thus the AC current present in it.

Figure 3:
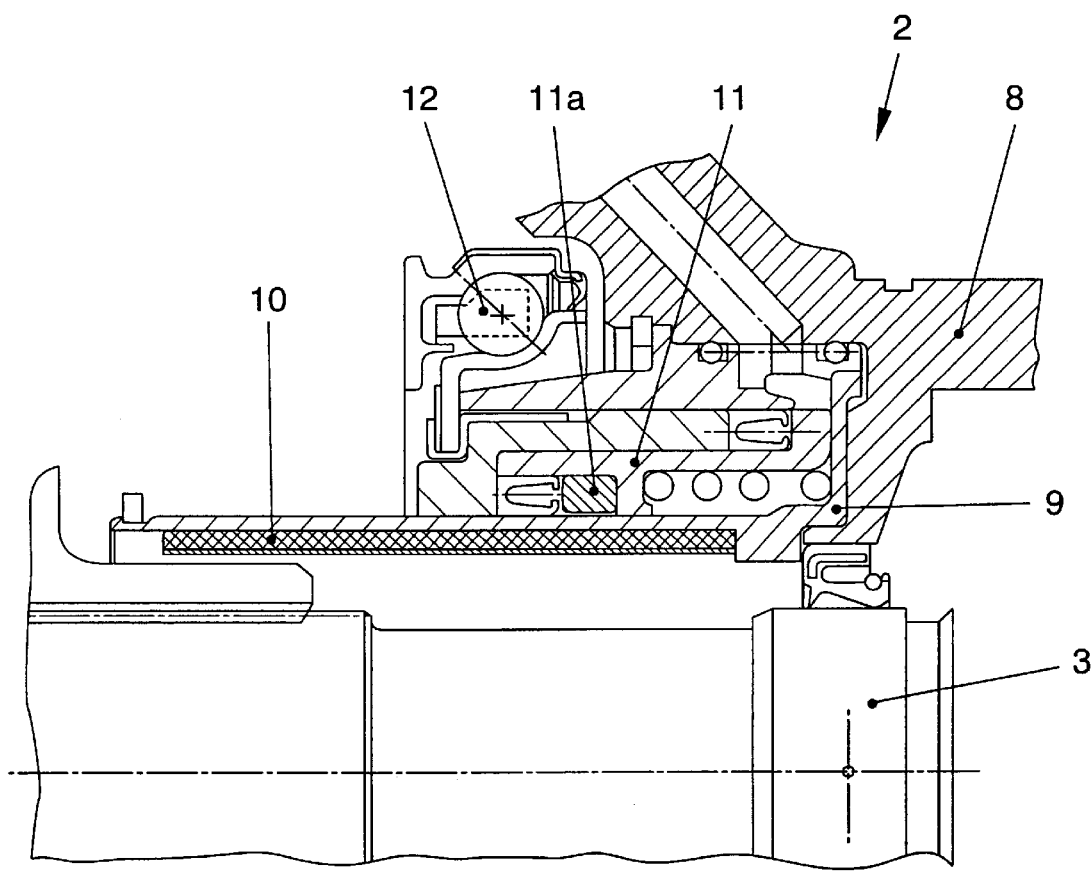
FIG. 3 is a sectional view illustrating a representative embodiment of a slave device situated near the friction clutch of FIG. 1 which includes a piston sensor in a radially inner part of the piston housing.

FIG. 3 illustrates a slave device similar to FIG. 2 except that the piston sensor 10 is mounted in the guide bushing 9 forming an inner part of the housing for the piston. The piston 11 is made of a nonmagnetic material such as plastic and contains a nonferromagnetic, electrically conducting target 11*a*. With this arrangement, the eddy current is induced in the target 11*a*.

Although the invention has been described herein with reference to specific embodiments, many modifications and variations therein will readily occur to those skilled in the art. Accordingly, all such variations and modifications are included within the intended scope of the invention.

We claim:

1. A friction clutch arrangement for motor vehicles by which a clutch can be actuated comprising a friction clutch, a clutch actuating device having a slave device located adjacent to the friction clutch, a master control device at a location spaced from the friction clutch, and a force transmission system extending between the master control device and the slave device, wherein the slave device comprises a fixed cylinder, a piston arrangement movable within the fixed cylinder which comprises a nonferromagnetic, electrically conductive metal, and a piston sensor with a variable inductance extending essentially parallel to the displacement path of the piston, wherein the length of the piston sensor in the axial direction is at least as great as the length of the displacement path of the piston.

2. A friction clutch arrangement according to claim 1 wherein the slave cylinder comprises at least two parts.

3. A friction clutch arrangement according to claim 1 wherein the slave cylinder is made of nonmagnetic material in the region between the piston and the piston sensor.

4. A friction clutch arrangement according to claim 1 wherein the metal is aluminum.

* * * * *